Sept. 10, 1968            R. SEITZ            3,400,494
APPARATUS FOR MACHINING HARD MATERIALS
Filed Sept. 24, 1965
FIG. 1
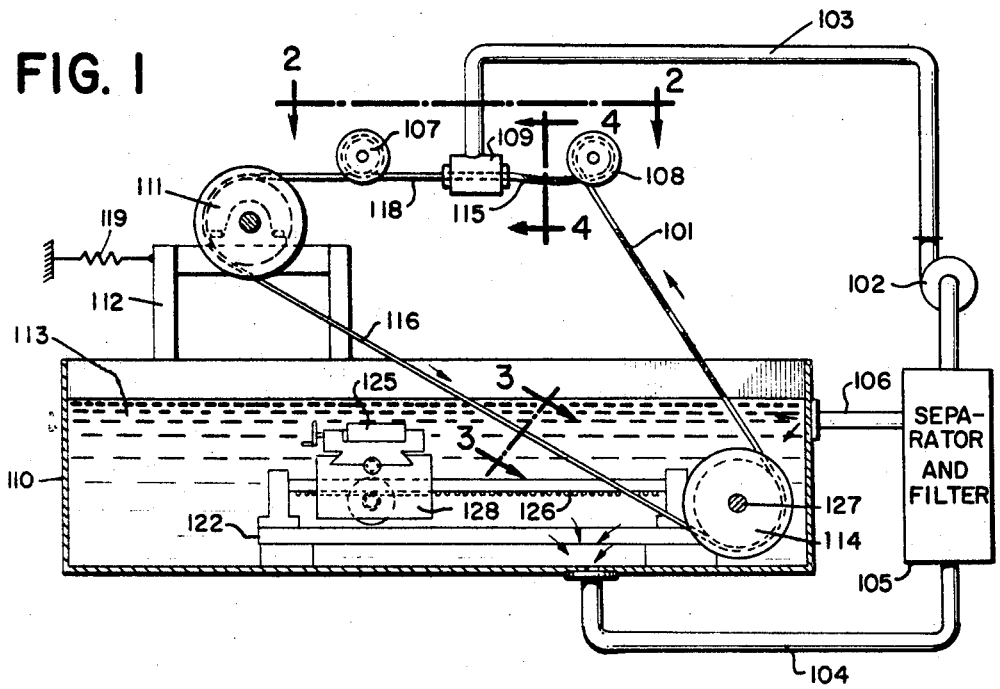
FIG. 2
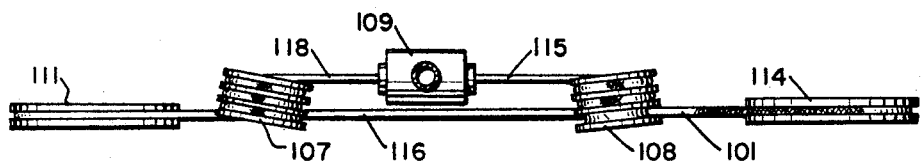
FIG. 3
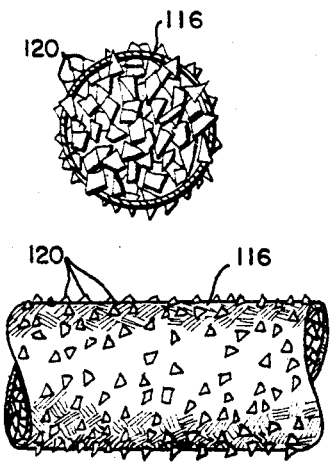
FIG. 4
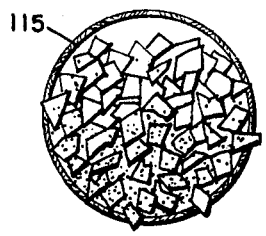
FIG. 5
INVENTOR.
RUSSELL SEITZ
BY
*Nolte and Nolte*
ATTORNEYS

United States Patent Office 3,400,494
Patented Sept. 10, 1968

3,400,494
APPARATUS FOR MACHINING HARD MATERIALS
Russell Seitz, Elberon, N.J. 07740
Filed Sept. 24, 1965, Ser. No. 494,299
7 Claims. (Cl. 51—148)

ABSTRACT OF THE DISCLOSURE

A tubular cord woven of abrasion resistant fibres and filled with a plurality of free abrasive particles is moved across a work piece to be cut. By means of a spring loaded pulley the cord is tensioned so that the diameter thereof is reduced and the abrasive particles penetrate through the fabric of the cord. In the subsequent section of the cord travel, the tension is relaxed and a charging head surrounding the tension relieved portion reinserts under pressure new abrasive particles into the cord. The work piece is submerged in a tank containing a lubricator fluid. Byproducts of the cutting process are filtered, separated and, by means of a pump, driven partially back to the charging head.

---

This is a continuation of application Ser. No. 468,275, filed June 30, 1965, now abandoned.

This invention relates to an apparatus for machining and cutting hard materials. More particularly this invention provides an apparatus for cutting and machining metals and other hard substances by means of a continuous band having an abrasive charged thereto.

In the cutting and machining of hard substances, such as crystals, diamonds, and metals in which conventional machine tools are employed, it has been found that after the materials are cut by conventional sawing techniques jagged edges are produced along the severed surfaces of the substances thereby creating the necessity of additional grinding and finishing operations.

Moreover, the machine tools, presently used in the cutting of hard materials, often require replacement as these tools become dull or wear away after repeated cutting operations. Furthermore, as the cutting tools wear down, they can no longer be indexed accurately against the surface of the material being cut so that it is often not possible to obtain controlled cuts into hard surfaces. Moreover, in grinding the materials after they have been severed, to finish them for their ultimate use, it has been found that the grinding and finishing wheels also wear down sufficiently so that they no longer retain their accurately formed cutting surfaces and therefore must be discarded. In cutting saws employing hardened surfaces such as diamond edges, it has been found that the repeated use of these tools caused the diamond edges to gradually erode requiring expensive replacement of the cutting tool.

It is, therefore, an object to the present invention to provide an apparatus for simultaneously cutting and finishing hard substances both accurately and inexpensively.

It is another object of this invention to provide an apparatus for cutting and finishing hard surfaces which has an improved life span over existing devices.

It is another object of the present invention to provide an apparatus which has a tool constructed from abrasives which not only has a long life but is also rechargeable during its continuous life and use.

It is another object of the present invention to provide an apparatus for cutting and finishing crystalline materials with a minimum of surface damage and lattice distortion during the cutting process.

With the ability of industry to produce silicon carbide fibers in long lengths, it has become feasible to weave these fibers into a rope or cord having the properties of extremely high abrasion resistance and tensile strength. This cord is then charged with an abrasive material such as tungsten carbide or diamond dust. In the embodiments discussed herein, the preferred apparatus consists of a plurality of pulleys which contain an endless cord comprised of the silicon carbide filaments and which urge this cord, in the presence of a lubricant, against a work piece for the purposes of cutting through the work piece as well as simultaneously grinding a smooth surface thereon. The cord is maintained in tension while in contact with the work piece in order to facilitate the cutting and grinding operations. However, during part of its endless cycle the tension in the cord is relaxed in order that the abrasive particles such as tungsten carbide or diamond chips may be intermeshed into the filaments of the cord to replace those which has been expended during the machining operation. Moreover, the apparatus according to the invention has the advantage of that the abrasive particles which separate from the revolving cord may be collected and separated from the byproducts of the machining operation and recirculated back into the system to recharge the abrasive cord.

Other objects and features of the present invention will become apparent from the following detailed description considered in connection with the accompanying drawings which disclose the embodiments of the present invention. It should be understood, however, that the drawings are designed for purposes of illustration only and not as a definition of the limits of the invention as to which reference should be made to the appended claims.

In the drawings, wherein similar reference characters denote similar elements throughout the several views:

FIG. 1 is a side elevation, partially in cross-section, of the cutting and grinding apparatus according to the present invention;

FIG. 2 is a sectional illustration through line 2—2 of FIG. 1;

FIG. 3 is a sectional illustration through lines 3—3 of FIG. 1 showing a cross-sectional view of the fully charged cord containing the abrasives;

FIG. 4 is a sectional illustration through line 4—4 of FIG. 1 showing a cross-sectional view of the cord prior to charging with abrasive particles;

FIG. 5 is an enlarged side view of the abrasive cord showing the chips of abrasive protruding through the fabric of the material.

Accordingly, referring to the figures, there is shown an apparatus, according to the present invention, in which a tank 110 contains a lubricating material 113 contained within for providing lubrication during the machining operations on a work piece 125. Located within the lubricating solution 113 is a work piece holding device 122 for securing and guiding work piece 125 during the cutting and grinding operations. Disposed at one end of holding device 122 is a pulley 114 containing an endless hollow cord 116 which is woven of abrasion resistant fibres and filled with a plurality of free abrasive particles.

In order to guide and to adjust the angle of attack of the cord 116 with respect to work piece 125, a pulley 111, mounted on a slidable stand 112, feeds cord 116 into the tank containing the work piece which is submerged in the solution 113. Standard 112 is spring loaded by means of spring 119 in order to reduce cross-section of cord 116 and, as a consequence, to induce penetration of retained abrasive particles therethrough while it is used to machine work piece 125.

Pulley 114, which receives cord 116 from pulley 111 after the machining of work piece 125, is connected to shaft 127 which is trunnioned on one end of holding piece 122 and driven by a conventional motor or other drive means (not shown) at a constant or at a variable rate depending on the type of material to be machined. Shaft 127 may be suitably geared to carriage 128 to travel along the stationary rack 126 of holding piece 122 so as to urge work piece 125 against the abrasive cord at a predetermined cutting rate.

The endless cord 116, as indicated above, may be comprised of a plurality of long silicon carbide filaments woven together to form a cord having a hollow center as shown in FIGS. 3 and 4. Into the center of cord 116 is inserted a plurality of abrasive particles 120, shown in exaggerated size, and which protrude through the fabric of the cord at the periphery along the entire length thereof. The abrasive particles 120 may consist of tungsten carbide or diamond chips or any other form of abrasive material commonly employed in machining operations. Cord 116 is woven in such a manner so that when it is stretched in tension, as between pulleys 111 and 114, the abrasive particles 120 contained within are compressed in such a manner as to be forced outward through the openings between the weave along the periphery of the cord as shown in FIG. 3. However, when tension is removed from cord 116, due to the resiliency of the fibers, the cord becomes enlarged in diameter such as shown in FIG. 4 by cord 115. Moreover, the enlargement of the cord also causes the spaces between the fibers in the weave to become parted or open up thereby permitting additional abrasive particles to be inserted within the center of the cord. The recharging of the abrasive cord in a continuous manner is best illustrated in the apparatus according to this invention. As cord 116 leaves pulley 114 on its exit from bath 113, the tension on the cord is partially relieved as shown by the appearance of cord segment 101 as it enters pulley 108. Pully 108 may be spiralled to additionally relieve the tension on cord 101 so as to cause a further increase in its diameter as shown by cord segment 115. Cord segment 115 enters a charging head 109 which contains abrasive particles 120 under pressure so that they may be forced between the fiber openings in the weave of the enlarged section of the abrasive cord prior to the removal of the cord from pulley 107. Thus cord segment 118 will contain more abrasive particles within the center of its core than segment 115. Pully 107 feeds the abrasive cord to pulley 111 where tension is applied to shrink the diameter of the cord and to compress the abrasive particles contained within.

It is also within the scope of this invention to make the abrasive cord in the form of a woven cable comprised of a plurality of filaments made of materials such as silicon carbide, wherein the abrasive particles are held between the strands by the tension applied to the cord by the pulleys. In this particular construction, the cable would not contain a hollow center but would contain a cross section comprised of a plurality of filaments that are braided and contain the abrasive particles interlocked between the individual filaments within and along its periphery. The abrasive cord may be woven from any material having the properties of good tensile strength, high abrasion resistance and good flexibility. Although silicon carbide is a preferred material for the fabric of the cord, it is conceivable that there are other synthetic materials having the above-mentioned properties which would work equally as well.

Another advantage according to the invention is that the abrasive particles may be collected at the bottom of tank 110 by conduit 104 together with the byproducts of the cutting and grinding operation and separated by separator 105 in any number of conventional ways and be reinserted back into the abrasive cord. Separator 105 removes the abrasive articles from the lubricant 113 and the byproducts of the grinding and cutting operation and returns the lubricant back into the bath through conduit 106. Part of the lubricant together with the separated abrasive particles are pumped by pump 102 through conduit 103 into the charging head 109 where they are applied under pressure to recharge the abrasive cord passing therethrough in a manner described above. The apparatus according to this invention thus permits the use of expensive abrasives such as diamond particles and the like to be used continuously for the machining and cutting operations since there is little or no loss of the costly abrasive.

The abrasive particles 120 which protrude through the fabric of the abrasive cord 116 (shown in an exaggerated view), form an extremely fine abrasive surface over the periphery of the cord so that when used in conjunction with the lubricating fluid 113 the particles perform the simultaneous operations of cutting and grinding during the machining of work piece 125. Due to the high tensile strength of the silicon carbide filaments comprising the fabric of the abrasive cord, the cord may be placed under extreme tension and reduced to the thickness of a fine thread and thinner than the cutting edge of conventional cutting blades or saws. This feature provides cuts in which substantially less of the work piece material is removed during the cutting process so that improved dimensional accuracy may be realized. Since the apparatus has the advantage of producing not only a dimensionally more accurate cut but one which is simultaneously polished by the abrasive, it is possible to shape the work piece by making only a single cut along any of its surfaces. Moreover, by performing the cutting and grinding operations in a lubricating fluid at a low angle of attack by using a very fine abrasive particle, it is possible to perform machining operations which were previously impossible to perform on extremely fragile crystals and other delicate substances since the presence of the abrasive cord produces less stresses against the crystal and thereby produces much less lattice deformation as their surfaces are cut and polished. Moreover, by lubricating the workpiece with lubricant 113 during the cutting and grinding operation, it is thus possible to cool the workpiece directly on its machined surface so as to dissipate any damaging heat which may be produced. The abrasive cord 116 need not have a circular cross-section but may be a flat belt or triangular to perform either cutting or grinding, or both.

While only a single embodiment of the present invention has been shown and described, it will be understood that many changes and modifications may be made therein without departing from the spirit of the invention as defined in the appended claims.

What I claim is:

1. An apparatus for cutting and grinding a work piece comprising a woven hollow cord having a multipilcity of abrasive particles freely retained therein, means for moving the cord on a predetermined path, means for applying tension to that portion of the cord crossing a surface of said work piece, means for relieving the tension over a second portion of the cord apart from said first portion; and charging head surrounding the tension relieved second portion of the cord, for applying the abrasive particles under pressure to the cord as it passes therethrough.

2. The apparatus as claimed in claim 1 wherein said hollow cord has the form of an endless loop.

3. The apparatus as claimed in claim 2 further comprising a tank containing a lubricating fluid being in contact with the cord and the work piece, and means for guiding and controlling the feed of said work piece during the cutting and grinding.

4. The apparatus as claimed in claim 3 wherein said moving means comprises a pair of pulleys disposed in a spaced relationship to define said first portion of the cord, one of said pulleys being driven by driving means and the second one being slidably supported and coupled with said tension applying means.

5. The apparatus as claimed in claim 4 wherein said tension applying means includes a spring for spring loading said slidably supported pulley against said driven pulley.

6. The apparatus as claimed in claim 5 wherein said tension relieving means include a pair of pulleys having spiral grooves containing said cord, and being disposed in spaced relationship exterior of said tank to define said second cord portion therebetween.

7. The apparatus as claimed in claim 3 further comprising a separator and filter means interconnected between said tank and charging head by a conduit system having a pump to collect and separate abrasive particles from said lubricating fluid and to reinsert said particles into the charging head.

References Cited

UNITED STATES PATENTS

| | | | |
|---|---|---|---|
| 511,715 | 12/1893 | Shea | 125—21 |
| 3,127,712 | 4/1964 | Krogen | 51—148 |
| 3,150,470 | 9/1964 | Barron | 125—21 X |
| 3,220,149 | 11/1965 | Dioguardi | 125—21 X |
| 3,257,792 | 6/1966 | Joy | 125—21 X |

LESTER M. SWINGLE, *Primary Examiner.*

D. G. KELLY, *Assistant Examiner.*